United States Patent Office 3,413,099
Patented Nov. 26, 1968

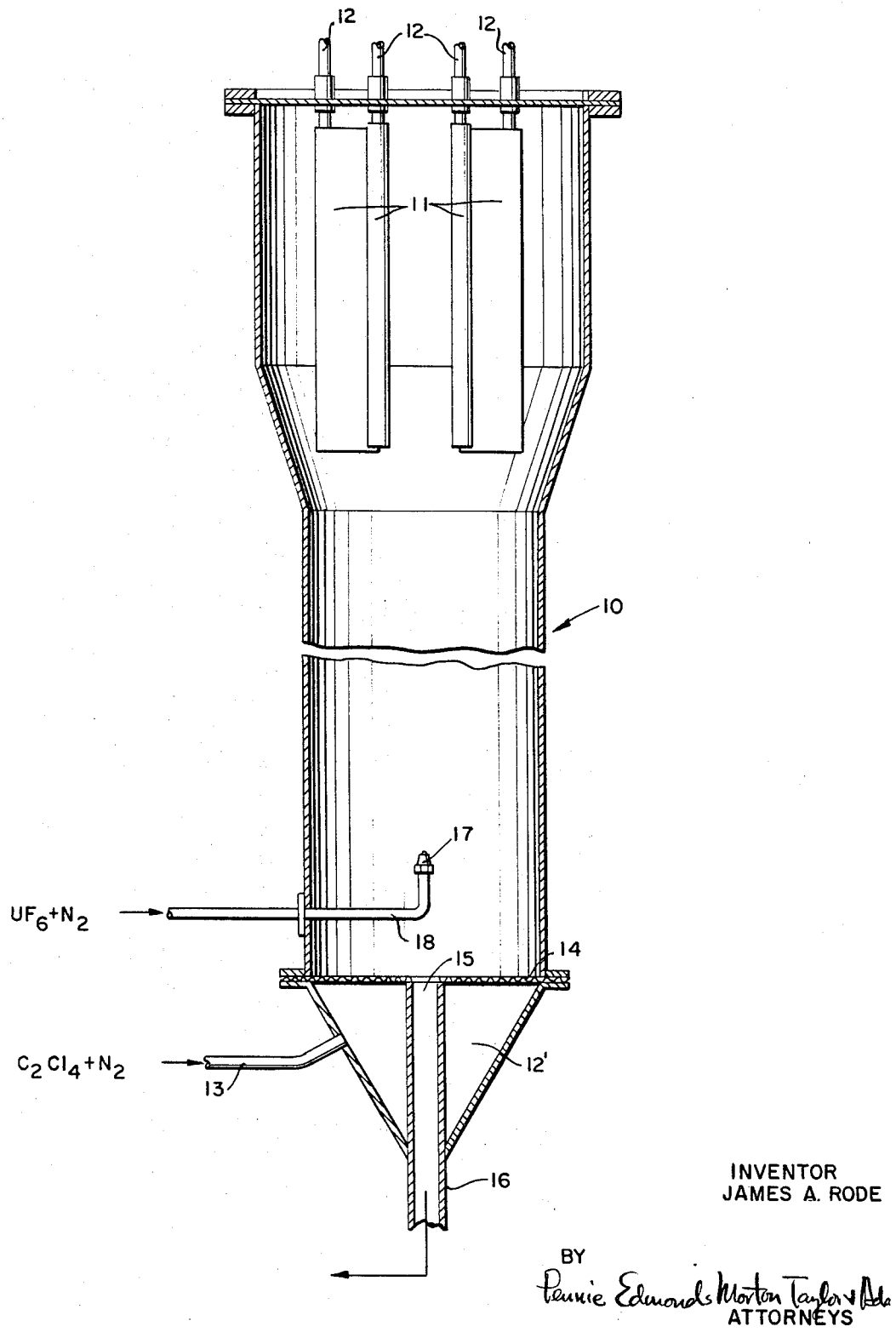

---

3,413,099
PRODUCTION OF URANIUM TETRAFLUORIDE
James A. Rode, St. Louis, Mo., assignor to United Nuclear Corporation, White Plains, N.Y., a corporation of New York
Filed Nov. 14, 1966, Ser. No. 594,201
11 Claims. (Cl. 23—353)

ABSTRACT OF THE DISCLOSURE

High bulk density $UF_4$ is produced by converting $UF_6$ in a fluidized bed reactor in which $UF_4$ particles are suspended by gaseous mixtures of $UF_6$, tetrachloroethylene or an equivalent organic fluorine acceptor containing 1 to 3 carbon atoms, and a diluent, nitrogen. The temperature within the fluidized bed is in the range of 500° F. to 600° F., and the amount of tetrachloroethylene introduced into the fluidized bed is sufficient to provide a stoichiometric excess of about 9% to 12% for the conversion of $UF_6$ to $UF_4$. The excess $UF_4$ particles generated in the fluidized bed are removed therefrom.

---

This invention relates to high bulk density uranium tetrafluoride and, more particularly, to a new process for producing the same.

In the production of ceramic grade $UO_2$ from $UF_6$, the hexafluoride is initially reduced to the tetravalent form, and the latter is then converted by pyrohydrolysis to uranium dioxide. For economic production, the intermediate product, uranium tetrafluoride, must be substantially free of other forms of fluoride contaminants such as $UF_5$, $U_2F_7$, and $U_4F_{17}$ and has a relatively high bulk density. A preferred type of prior processes for the preparation of uranium tetrafluoride from $UF_6$ involves a vapor-phase reaction using hydrogen, carbon tetrachloride, ethylene dichloride, trichloroethylene or chloroform as a reductant for the conversion of $UF_6$ to its tetravalent form. To avoid the formation of undesirable $UF_5$ and other forms of uranium fluorides in the process, the reaction must be closely controlled. The $UF_4$ thus produced is an extremely fine powder of low bulk density.

The low bulk density uranium tetrafluoride powder is difficult to handle and the uranium dioxide produced therefrom has similar low bulk density physical characteristics which are undesirable for the preparation of ceramic grade $UO_2$ pellets used in the nuclear fuel elements. Attempts to increase the bulk density in the vapor-phase type process have not been very successful. The bulk density of $UF_4$ powder produced according to some of the modified vapor-phase reactions is still substantially below the desired value.

In the process of this invention, a high bulk density uranium tetrafluoride is produced from uranium hexafluoride which is substantially devoid of other forms of uranium fluoride contaminants. Broadly stated, the process involves the introduction of gaseous $UF_6$ and a gaseous organic fluorine acceptor containing 1 to 3 carbon atoms into a fluidized bed of $UF_4$ solid particles. The concentration of the gaseous $UF_6$ and the organic fluorine acceptor and the temperature in the reaction zone are regulated to promote a surface-reaction on the solid $UF_4$ particles. A substantially constant volume of the fluidized bed is maintained by continuously withdrawing the $UF_4$ particles generated therein. Preferably, the reaction is carried out at a temperature in the range between about 500° F. and about 600° F.

Suitable organic fluorine acceptors are those containing 1 to 3 carbon atoms and are in the form of a vapor at the reaction temperature. Preferably, they are halogenated hydrocarbons containing an unsaturated chain. I found compounds of the following structural formula to be particularly desirable:

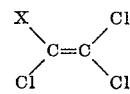

wherein X is F or Cl. Using either

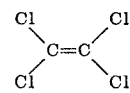

or

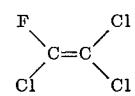

for the reduction of $UF_6$, the by-product is the valuable Freon.

In the process of this invention, the reaction of $UF_6$ and the organic fluorine acceptor is predominantly a coating type or a surface induced reaction. The $UF_4$ from the reduction operation is produced in the form of a coating on the $UF_4$ seed in the fluidized bed. Attrition of the large particles or fines generated by the minor vapor-phase operation produces additional seed or surface area for the reaction to replace the surface area that is lost by particle growth and by the particles removed from the bed.

The reaction rate is a function of the temperature and concentration of the reactants. I have found that the rate of the vapor-phase reaction of $UF_6$ and the organic fluorine acceptor increases more rapidly than the surface induced reaction as the temperature or concentration increases. The reaction, therefore, is advantageously carried out at a temperature and concentration where the vapor-phase reaction is at a minimum while the surface reaction is at its maximum. It is noted that a minor amount of vapor-phase reaction is tolerable because it generates additional seeds or reaction surface upon which the new green salt is deposited causing particle growth. Hence, the temperature and concentration may be varied individually or jointly to control the reaction so that it will provide a stable surface area in the fluidized bed. It is found that the reaction is best controlled by the variation of concentration. This is because variation of the reaction rate caused by the fluctuation of the concentration is more moderate compared to that caused by the change of temperature.

The critical limitation in this process is the minimum residence time of the organic fluorine acceptor which is dependent on the temperature and concentration. The residence time in the fluidized bed is defined by the following equation:

$$\text{Residence time} = \frac{\text{volume of the fluidized bed}}{\text{flow rate of the gas}}$$

I found that in carrying out the process of this invention at a residence time below a certain value leads to excess "fine" production and formation of undesirable $UF_5$.

The residence time is varied for each organic fluorine acceptor. It was found that the minimum residence time is 1.0 second for the reaction of $UF_6$ and $Cl_2C=CCl_2$ at a temperature in the range of about 500° F. to about 600° F.

Further to illustrate this invention specific examples are described hereinbelow with reference to the accompanying drawings wherein FIG. 1 is a photograph of $UF_4$ particles produced in a typical run in accordance with the invention, magnified 800 times, and FIG. 2 is a fluidized reactor partly in section used for the production of the $UF_4$ particles.

In these examples, tetrachloroethylene is used as the organic fluorine acceptor. In carrying out the process, the fluidized reactor 10 is initially loaded with $UF_4$ particles about +100 mesh in size. The reactor 10 is substantially in the form of a cylinder having an interior diameter of about 4 inches. The top portion of the reactor 10 is equipped with a plurality of filters 11 having gas outlet pipes 12 in communication with the interior of the filters. One or more of the filters may be used at a time while a flow of gas is passed in reverse through the other filters to remove the dust collected thereby.

The fluidizing gas, nitrogen, and tetrachloroethylene are introduced into the lower chamber 12 of the fluidized reactor through gas inlet 13. The lower chamber 12 is separated by a diffusion disk 14 which has a central hole 15 connected to the product line 16 from which the excess $UF_4$ particles are removed. A mixture of preheated nitrogen and gaseous $UF_6$ is introduced into the fluidized bed through nozzle 17 connected to pipe 18. The feed nozzle 17 may be a dual gas nozzle consisting of an inner nozzle for $UF_6$ diluted with nitrogen and an annular nozzle for nitrogen surrounding the inner one. This type of nozzle has the advantage of delaying the mixing of the tetrachloroethylene and $UF_6$ thereby eliminating reaction at the nozzle.

The amount of seed used depends on the particle size, hence, total surface area. For a seed bed using the +100 mesh particles, 26 to about 35 pounds of $UF_4$ may be used. The amount of $C_2Cl_4$ used is more than the stoichiometric amount required for the conversion of $UF_6$ introduced into the reactor. The percentage of excess may vary depending on the reaction variables. A molar excess of more than 100 percent may be used as determined by the "off" gas from the reactor.

EXAMPLE 1

This example is used to illustrate the computation of residence time based on the minimum conditions for $UF_6$ to $UF_4$ conversion using $C_2Cl_4$:

$UF_6$ flow 34 lb./hr. (Does not enter into calculation because $UF_4$ is a solid.)

| $N_2$ flow: | S.c.f.h. |
|---|---|
| Nozzle | 30 |
| Annulus | 30 |
| Fluidizing gas | 72 |
| Purges | 10 |
| Total $N_2$ | 142 |

$$N_2 \text{ flow at reactor temp. and press.} = 142 \text{ c.f.h.} \times \frac{960° \text{ R.}}{492° \text{ R.}} \times \frac{15 \text{ p.s.i.}}{30 \text{ p.s.i.}} = 138.5 \text{ c.f.h.}$$

Perclene flow 1.3 g.p.h.:

$$\text{Perclene flow c.f.h. at reactor temp. and press.} = \frac{1.3 \text{ g.p.h.} \times 13.55 \text{ lb./gal.} \times 359 \text{ cu.ft./mole}}{166 \text{ lb./lb. mole}}$$

$$\times \frac{960° \text{ R.}}{492° \text{ R.}} \times \frac{15 \text{ p.s.i.}}{30 \text{ p.s.i.}} = 37.2 \text{ c.f.h.}$$

$$\text{Total flow (N}^2 \text{ perclene)} = 138.5 + 37.2 = 175.7 \text{ c.f.h. or } \frac{175.7 \text{ c.f.h.}}{3600 \text{ sec./hr.}}$$

$$= 0.04885 \text{ cu.ft./sec.}$$

$$\text{Cross-sectional area of 4'' bed} = \frac{\pi d^2}{4} = \frac{\pi 4^2}{4} = 12.57 \text{ sq. in.}$$

Bed height above nozzle = 21.5 inches

Bed volume = $H \times A = 21.5 \times 12.57 = 270$ cu. in.

$$= \frac{270 \text{ cu. in.}}{1728 \text{ cu. in./sq. ft.}} = 0.1564 \text{ cu. ft.}$$

$$\text{Residence time in bed} = \frac{\text{vol. bed}}{\text{flow}} = \frac{0.1564 \text{ cu. ft.}}{0.04885 \text{ cu. ft./sec.}}$$

$$= 3.21 \text{ sec.}$$

EXAMPLE 2

This example is used to illustrate a typical run using the following operational conditions:

| | |
|---|---|
| Seed weight (lbs.) mesh | 33.0+100 |
| $UF_6$ rate (#/hr.) | 25.0 |
| Run time (hrs.) | 18.0 |
| Reaction temp. (° F.) | 500–550 |
| Gas composition (percent): | |
| $UF_6$ | 8.0 |
| $N_2$ | 75.0 |
| $C_2Cl_4$ (in) | 17.0 |
| $C_2Cl_4$ (out) | 9.0 |

During the first six hours of the run, the particle size increases to a level of 97% +200 mesh. After 6 hours, fines production began leveling off at approximately 60% fine apparently because the bed volume and/or surface area had been reduced through minor losses of fines from the bed and/or growth of particles. The screen analysis of the product showed less than 2% of −200 mesh and about 30% 200 mesh. The particles have a "particle density" of about 6.7 g./cc. which is essentially the theoretical value for the density of $UF_4$. A photograph of the particles with 800× magnification is shown in FIG. 1. The bulk density of the $UF_4$ particles is about 3.5 g./cc.

EXAMPLE 3

This example is used to illustrate the growth of $UF_4$ particles during a typical run using the following operational conditions. The growth of the particles was stabilized after about 14 hours:

Seed weight, 45 lbs. _____mesh__ −100−200
$UF_6$ feed rate _____lbs./hr__ 12
Run time _____hours__ 24
Reaction temp. (° F.):
    Immediately above the gas distributor __ 530−560
    Balance of reactor _____ 560−600

| Gas | Flow, c.f.h. | Percent in | Percent out |
|---|---|---|---|
| $UF_6$ | 12.24 | 10.7 | |
| $N_2$ | 82 | 71.5 | 80 |
| $C_2Cl_4$ (in) | 20.51 | 17.8 | |
| $C_2Cl_4$ (out) | 8.27 | | 8.0 |

| Time | +100 | −100+200 | −200+325 | −325 |
|---|---|---|---|---|
| 13:30 | 22 | 32 | 37 | 9 |
| 14:40 | 26 | 36 | 33 | 5 |
| 15:55 | 28 | 39 | 30 | 3 |
| 16:55 | 44 | 37 | 17 | 2 |
| 17:55 | 38 | 46 | 14 | 1 |
| 18:55 | 42 | 50 | 8 | <1 |
| 19:55 | 44 | 49 | 6 | <1 |
| 20:55 | 46 | 49 | 5 | <1 |
| 21:55 | 48 | 48 | 4 | <1 |
| 22:55 | 58 | 39 | 3 | <1 |
| 23:55 | 59 | 39 | 2 | <1 |
| 1:05 | 56 | 42 | 2 | <1 |
| 2:05 | 63 | 35 | 2 | <1 |
| 3:15 | 61 | 38 | 2 | <1 |
| 4:20 | 64 | 34 | 1 | <1 |
| 5:30 | 66 | 32 | 1 | <1 |
| 6:50 | 69 | 30 | 1 | <1 |
| 8:05 | 72 | 27 | 1 | <1 |
| 9:20 | 71 | 28 | 1 | <1 |
| 10:20 | 71 | 28 | 1 | <1 |
| 11:20 | 71 | 28 | 1 | <1 |
| 12:20 | 70 | 28 | 2 | <1 |

I claim:

1. A process for the conversion of $UF_6$ to $UF_4$ which comprises introducing gaseous $UF_6$ and a gaseous organic fluorine acceptor containing 1 to 3 carbon atoms into a fluidized reaction zone having fluidized $UF_4$ solid particles, regulating the concentrations of the gaseous $UF_6$ and the organic fluorine acceptor and the temperature in said reaction zone to promote a surface-reaction on said solid $UF_4$ particles, and removing the excess $UF_4$ particles in the reaction zone generated by the reaction of $UF_6$ and said organic fluorine acceptor.

2. A process according to claim 1 wherein the reaction temperature is maintained in the range between about 500° F. and about 600° F.

3. A process according to claim 2 wherein the organic fluorine acceptor has the structural formula:

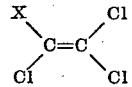

wherein X is Cl or F, and nitrogen is used as a fluidizing gas.

4. A process according to claim 3 wherein the organic fluorine acceptor has the structural formula:

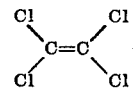

and the amount of said organic fluorine acceptor in the reaction zone is maintained in a stoichiometric excess required for the $UF_6$ to $UF_4$ conversion reaction.

5. A process according to claim 4 wherein the minimum residence time for the organic fluorine acceptor in the reaction zone is about 1.0 second.

6. A process for the conversion of $UF_6$ to $UF_4$ which comprises introducing into a fluidized bed of $UF_4$ particles gaseous $UF_6$ and a gaseous organic fluorine acceptor containing 1 to 3 carbon atoms, the stoichiometric ratio of said fluorine acceptor to $UF_6$ being in excess of 1, maintaining the temperature within the fluidized bed in the range between about 500° F. and about 600° F., regulating the amount of excess fluorine acceptor to promote a surface reaction on the solid $UF_4$ particles to predominate a vapor-phase reaction, and withdrawing the excess $UF_4$ particles generated by the conversion of $UF_6$ to $UF_4$ from the fluidized bed.

7. A process according to claim 6 wherein the organic fluorine acceptor has the structural formula:

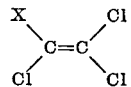

wherein X is Cl or F, and nitrogen is used as a fluidizing gas.

8. A process according to claim 6 wherein the organic fluorine acceptor has the structural formula:

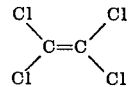

9. A process according to claim 8 wherein the organic fluorine acceptor has a minimum residence time in the fluidized bed of about 1.0 second.

10. A process for producing high bulk density which comprises introducing into a fluidized bed of $UF_4$ particles a gaseous mixture of nitrogen and $UF_6$ and a gaseous mixture of nitrogen and tetrachloroethylene, maintaining the temperature within the fluidized bed in the range of 500° F. to 600° F., regulating the amount of tetrachloroethylene introduced to said fluidized bed to provide a stoichiometric excess about 9% to 12%, and having a minimum residence time of 1.0 second, and withdrawing the excess $UF_4$ particles generated by the conversion of $UF_6$ to $UF_4$ from the fluidized bed.

11. A high bulk density $UF_4$ produced according to claim 10 of which less than 2% of the particles is finer than −200 mesh and has a bulk density about 3.5 gm./cc.

References Cited

UNITED STATES PATENTS 2,932,554    4/1960    Collins et al. _____ 23—353

FOREIGN PATENTS 801,382    9/1958    Great Britain.
806,855    12/1958    Great Britain.

OTHER REFERENCES

J. E. Baker, H. V. Klaus, R. A. Schmidt, S. H. Smiley: A Pilot Plant For the Reduction of $UF_6$ to $UF_4$ With Trichloroethylene, Report K1271, 1956, Oak Ridge Gaseous Diffusion Plant.

CARL D. QUARFORTH, *Primary Examiner.*

M. J. McGREAL, *Assistant Examiner.*

UNITED STATES PATENT OFFICE
CERTIFICATE OF CORRECTION

Patent No. 3,413,099                                                November 26, 1968

James A. Rode

It is certified that error appears in the above identified patent and that said Letters Patent are hereby corrected as shown below:

Column 3, line 35, "Total flow ($N^2$ perclene) should read -- Total flow ($N_2$ perclene) --. Column 5, after line 12 insert -- Recycle 33% -100 + 200 mesh --. Column 6, line 1, after "density" insert -- $UF_4$ --.

Signed and sealed this 10th day of March 1970.

(SEAL)
Attest:

Edward M. Fletcher, Jr.                              WILLIAM E. SCHUYLER, JR.

Attesting Officer                                                Commissioner of Patents